United States Patent [19]

Gordon et al.

[11] 4,418,404
[45] Nov. 29, 1983

[54] SINGLE-SIDEBAND ACOUSTIC TELEMETRY

[75] Inventors: Alan Gordon; Stanley J. Watson; Steven J. Cowen; Gerald Mackelburg, all of San Diego; Brett D. Castile, Del Mar, all of Calif.

[73] Assignee: The United States of America as represented by the Secretary of the Navy, Washington, D.C.

[21] Appl. No.: 307,403

[22] Filed: Oct. 1, 1981

[51] Int. Cl.³ .................. H04B 1/74; H04B 11/00
[52] U.S. Cl. .................. 367/132; 455/40; 455/142; 455/93
[58] Field of Search .......... 367/132; 455/46, 40, 455/93, 104, 101, 142, 143, 144, 203

[56] References Cited

U.S. PATENT DOCUMENTS

| | | | |
|---|---|---|---|
| 2,798,902 | 7/1957 | Kursman et al. | 179/1 |
| 3,164,800 | 1/1965 | Kroenert | 340/5 |
| 3,181,115 | 4/1965 | Wainwright | 340/5 |
| 3,181,116 | 4/1965 | Gordon | 340/5 |
| 3,231,852 | 1/1966 | Kritz | 340/5 |
| 3,337,841 | 8/1967 | Wainwright et al. | 367/132 |
| 3,688,197 | 8/1972 | Kahn | 455/142 |
| 3,789,353 | 1/1974 | Hunter et al. | 340/5 |
| 3,885,216 | 5/1975 | Kahn | 455/142 X |
| 3,973,203 | 8/1976 | Kahn | 455/203 X |
| 4,039,999 | 8/1977 | Weston | 340/5 |
| 4,253,193 | 2/1981 | Kennard | 455/101 |

Primary Examiner—Richard A. Farley
Attorney, Agent, or Firm—Robert F. Beers; Ervin F. Johnston; Thomas G. Keough

[57] ABSTRACT

An apparatus and method of transmitting and receiving information underwater assure improved performance characteristics. Modulating a carrier and appropriately filtering it allows the transmission of only single sideband signals or a carrier along with single sideband signals to increase the range at reduced power consumption levels. Demodulating incoming signals can be done synchronously (when the carrier is present) or asynchronously (only single sideband signals) to extract the information. When a number of carriers are modulated and, simultaneously, are transmitted and received, the system's reliability is enhanced.

5 Claims, 1 Drawing Figure

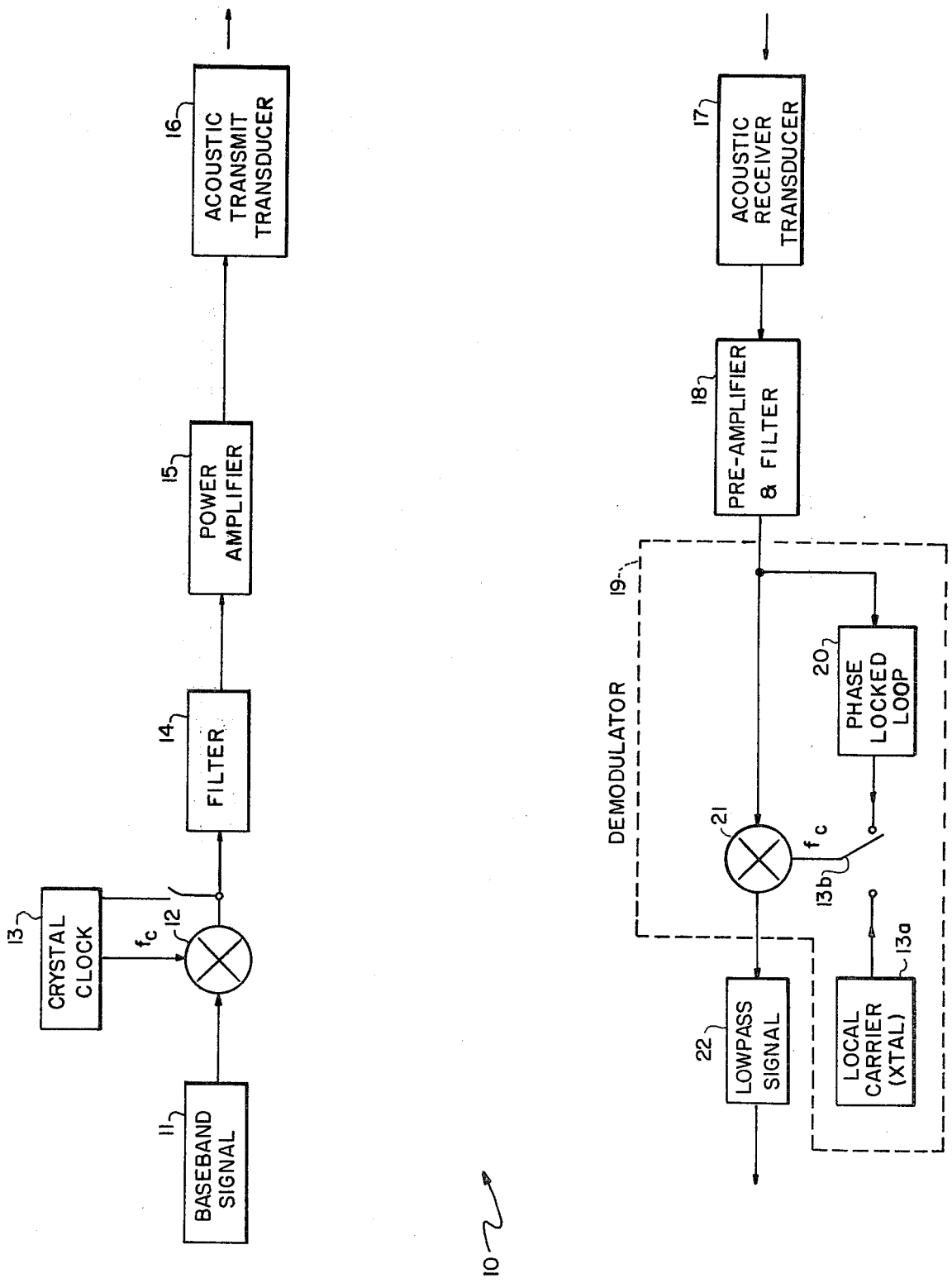

SINGLE-SIDEBAND ACOUSTIC TELEMETRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The increasing interest in developing undersea technologies has required that scientists and engineers gather and process vast amounts of data. The undersea environment imposes limitations on a good many telemetry functions so that the validity of the gathered data often is compromised.

One earlier communication system is disclosed in U.S. Pat. No. 2,798,902 by D. R. Kursman et al. Signals are picked up by a microphone, are converted to electrical signals and fed through a switch and through a balanced modulator which is also coupled to an oscillator. The upper and lower sidebands are transmitted from the transducer and, in like manner, received by the transducer. The Kursman et al reference provide only for the oscillator, for the asynchronous demodulation of an incoming signal and does not concern itself with synchronous as well as asynchronous operation.

A later development is disclosed by J. T. Kroenert in his U.S. Pat. No. 3,164,800. Here again, the bidirectional transmission through a water medium relies upon asynchronous system operation and, as such, the Kroenert telephony system stands as a noteworthy advance in the state of the art.

The diver communication system of U.S. Pat. No. 3,789,353 employs a transmitter and a double channel speech signal receiver. The adjustable gain amplifiers included in the channels have the usual balanced demodulator and interconnected low pass filter. While being a step forward in the state of the art, the emphasis of this system appears to be directed to signal enhancement that addresses the problems attendant diver communications.

A later development by John Weston in U.S. Pat. No. 4,039,999 employs ultrasonic frequency signals modulated by an audio input that particularly lend themselves to a helmet-mounted system. The thrust of the Weston system is to avoid the problems normally associated with crosstalk or scrambling among a number of divers simultaneously communicating within a given area. The capability for asynchronous or synchronous demodulation is not provided for.

Thus, there is a continuing need in the state of the art for an undersea transmitting and receiving system having the capability for synchronous and asynchronous operation that assures both long range communications and greater reliability, particularly when a number of channels are being simultaneously modulated and demodulated.

SUMMARY OF THE INVENTION

The present invention is directed to providing a method and apparatus for assuring more reliable long range undersea communications. At least one carrier frequency signal is generated and modulated by a baseband information signal, for example, an acoustic signal. All but a single sideband is filtered out or the carrier also may pass for transmission through the water medium. An asynchronous or synchronous demodulation capability is included to assure extraction of remotely originating information when it has been received from a remotely originating information source. Greater reliability is assured by simultaneously providing for a plurality of carrier frequencies and suitable asynchronous or synchronous demodulation.

OBJECTS OF THE INVENTION

A prime object of the invention is to provide for an increased undersea communication capability.

Yet another object is to provide for asynchronous and synchronous undersea communications.

Still another object is to provide for further reliability by simultaneously transmitting and receiving a number of undersea communications.

Yet another object is to provide for an undersea communication technique further enhancing reliability by the adaption of proven communication techniques.

These and other objects of the invention will become more readily apparent from the ensuing description and claims when taken with the appended drawings.

BRIEF DESCRIPTION OF THE DRAWING

The drawing depicts a block diagram of the essential features of the invention.

DESCRIPTION OF THE PREFERRED EMBODIMENT

Referring now to the drawing, a system 10 for assuring the simultaneous bidirectional transmission of information underwater provides data from a baseband signal source 11. The baseband signal source provides voice, video, or a high rate of digital data in acceptable form for being fed to a balanced modulator 12.

The balanced modulator is conventional in design and the particular unit chosen can be one of a multitude freely available in the art. It operates to shift the baseband signal (within the 1 db passband of 100 Hz to 2900 Hz) to a frequency determined by a crystal clock 13. The carrier frequency generated by the crystal clock can be single frequency, for example, eight to forty Khz or can be used to derive a family of phase locked carrier frequencies, the purpose of which will be explained below.

A sideband filter 14 is coupled to receive the output of the balanced modulator so that either an upper or lower sideband is all that passes to a following power amplifier 15. When synchronous operation is desired, the filter can be designed to pass the carrier frequency. In either event, the amplifier appropriately amplifies the information modulating carrier signals and feeds them to an acoustic transducer 16.

The acoustic transducer is one of a number of transducers in widespread use for undersea communications and can be a ferroelectric or piezoelectric design that serves to acoustically couple the information to the water medium. In this regard, all of the aforereferred-to components are designed and fabricated in accordance with sound practices to assure reliable operation in the undersea environment.

As mentioned above, in addition to the selected sideband of information passed by filter 14, a controlled amount of the carrier frequency originating in crystal clock 13 can be summed into the signal. This enables its use by a remote receiver when a synchronous detection mode as well as an asynchronous mode of energy detection are desired. Of course, the filter is modified to pass the carrier signal.

Acoustic energy from a distant source comes in through the water medium and impinges on acoustic receiver transducer 17. This impinging energy can be from a transmitting station or telemetry made up of the aforedescribed elements and the impinging signal can be either a single sideband signal or a composite signal made up of the single sideband signal along with a controlled amount of the carrier. The signals are received by a preamplifier and filter stage 18 that rid the signal of all unwanted components so that a demodulator 19 can further process the signal.

The demodulator can recover the carrier from the composite signal via a phase locked loop 20 or, if no carrier is transmitted, that being only the receiving of a single sideband signal, a crystal generated signal of like frequency is created in crystal clock 13a. This signal is switched into the circuit via a switch 13b (the switch may be manual or carrier frequency sensitive for automatic actuation as would be readily apparent to one skilled in the art). However, for purposes of clarity, two clocks are depicted and described to aid a reader's keeping separate the two different functions, those being modulation and demodulation. It is quite within the scope of this concept to combine the clocks as one.

A balanced modulator 21 shifts the received signal back to the original baseband where a low pass filter 22 eliminates all other unwanted modulation products.

The baseband signals occuping a spectrum of 100 Hz to 2900 Hz can be simultaneously transmitted and received with this system. Since the acoustic channel will somewhat distort the received signal with respect to the transmitted signal, it has been found expedient to transmit using a carrier frequency which minimizes reverberation; the transducers are also selected to have good front to back ratios to minimize surface and bottom reflection. Adequate levels to transmitting power also have been found to overcome propagation losses and ambient noise.

Further improvement of the system's reliability has called for the employment of a family of phase locked carrier frequencies generated by crystal clock 13. These carrier frequencies can be used to transmit simultaneously so that appropriate receivers can demodulate simultaneously over several acoustic channels. The same baseband signals can be transmitted over the channels to provide redundancy through frequency diversity. Frequency multiplexing of different baseband signals can also be transmitted over the individual channels defined by the phase locked carrier frequencies to provide an effective increase in the bandwidth of the communication system. Tests of the frequency diversity concept using carrier frequencies of eight and forty Khz have demonstrated successful, acceptable, operational characteristics.

Obviously, many modifications and variations of the present invention are possible in the light of the above teachings. It is therefore to be understood that within the scope of the inventive concept the invention may be practiced otherwise than as specifically described.

What is claimed is:

1. An apparatus for undersea transmitting and receiving comprising:
    a first crystal clock for generating a carrier signal between eight and forty Khz;
    means for providing an acoustic baseband information signal;
    means coupled to the generating means and the providing means for shifting the acoustic baseband information signal to a frequency determined by the carrier signal;
    means for passing signals made up of at least a single sideband of the acoustic baseband information modulation carrier signal;
    means for transmitting the passed signals through a water medium;
    means for receiving remotely originating signals in the water disposed near the transmitting means, the remotely originating signals being single sideband modulated signals and sideband signals along with a carrier signal;
    means coupled to the receiving means for synchronously and asynchronously demodulating the remotely originating signals into an information signal;
    a second crystal clock coupled to the demodulating means and generating substantially the same signal as the carrier signal for the first crystal clock to provide a demodulating signal when operating in the asynchronous mode; and
    a phase lock loop coupled to the demodulating means to provide a demodulating signal when operating in the synchronous mode.

2. An apparatus according to claim 1 in which the passing means is fabricated to pass signals also including the carrier signal.

3. A transceiver according to claim 2 in which the carrier signal generating means generates a plurality of carrier frequencies for modulation by the acoustic baseband information signal and the demodulating signal providing means assures demodulation of the plurality of carrier frequencies to assure greater reliability through frequency diversity.

4. A method of transmitting and receiving information through the water comprising:
    generating a carrier signal between eight and forth Khz with a crystal clock;
    providing an acoustic information signal;
    shifting the acoustic information signal to the frequency determined by the carrier signal;
    filtering out all but a single sideband of the acoustic information modulating carrier signal and, a portion of the carrier signal;
    transmitting the single sideband signal unfiltered signals through the water medium;
    receiving a remotely originating signal in the water;
    synchronously and asynchronously demodulating the remotely originating single sideband signal; and
    providing a demodulating signal from another crystal clock for the step of demodulating that is substantially the same as the carrier signal from a crystal clock generating the carrier signal for asynchronous operation and further providing a demodulating signal with a phase lock loop for the step of demodulating for synchronous operation.

5. A method according to claim 4 in which the step of providing a carrier signal is the providing of a plurality of carrier signals for modulation by the information signal and the providing of the demodulating signal is the providing of a number of demodulating signals to improve reliability.

* * * * *